United States Patent [19]

Pearson et al.

[11] 4,116,418

[45] Sep. 26, 1978

[54] FLEXIBLE COUPLINGS FOR PROVIDING FLUID COMMUNICATION BETWEEN TWO MEMBERS

[75] Inventors: Kenneth White Pearson; David William Thomas Richards, both of Yeovil, England

[73] Assignee: Shipowners Refrigerated Cargo Research Association, London, England

[21] Appl. No.: 720,045

[22] Filed: Aug. 30, 1976

[30] Foreign Application Priority Data

Sep. 9, 1975 [GB] United Kingdom ............... 37147/75

[51] Int. Cl.² ............................................. F16L 29/00
[52] U.S. Cl. ................................. 251/149.2; 251/150; 285/9 R
[58] Field of Search ............ 251/228, 61, 149.1–149.9; 137/614.01–614.06, 798, 799, 150; 285/9 R

[56] References Cited

U.S. PATENT DOCUMENTS

| | | | |
|---|---|---|---|
| 3,473,828 | 10/1969 | Pearson ................................. | 285/9 R |
| 3,606,389 | 9/1971 | Monton et al. ....................... | 285/9 R |
| 3,713,623 | 1/1973 | Pearson ......................... | 251/149.2 X |
| 3,985,151 | 10/1976 | Smith ................................. | 251/61 X |

*Primary Examiner*—William R. Cline

[57] ABSTRACT

A container coupling suitable for connecting an aperture leading to the interior of a container with a duct for the supply or return of conditioning fluid, the coupling having a first end for connection to the duct and a second end for releasably sealingly engaging a flat sealing surface surrounding the aperture in the container, and the second end of the coupling being movable relative to the first end between a withdrawn inoperative position and an extended sealing position, the coupling having an annular body extending in sealing engagement between said first and second ends and wherein a rolling diaphragm is provided preferably between each end of the annular body and the associated end of the coupling, the rolling diaphragms being in sealing engagement between the body and the coupling ends and defining an annular inflatable space to which fluid may be supplied or exhausted for operating the coupling, there being hinge means connecting the two ends of the coupling together and there preferably being an automatic operating valve within the coupling which opens when the coupling is extended and closes when it is retracted.

16 Claims, 4 Drawing Figures

FLEXIBLE COUPLINGS FOR PROVIDING FLUID COMMUNICATION BETWEEN TWO MEMBERS

This invention relates to a coupling suitable for connecting an air conditioning duct with an aperture in the wall of a container. Such couplings are required for conditioning the interior of containers used for transporting food, for example from one country to another, and more often than not the environment within the container has to be kept cold and often refrigerated.

The containers are transported from one country to another by ship and therefore have to be connected to an installation within the ship for supplying gas to the interior of the containers. Each container is provided with an inlet aperture and an outlet aperture for the conditioning gas, each of which has to be connected to supply and return ducts leading to the source of gas by means of an extendable and retractable coupling. These couplings are therefore used both on shore installations and also on board container ships for transporting the containers from one country to another.

The size of the containers is standard, as is the location of the apertures in one of the container walls. Traditionally the containers are stacked vertically between vertical guides and hence the vertical location of the apertures in the walls of the containers of a stack of containers is standard, but on the other hand, because there must be a certain amount of play between the containers side walls and the guides, the horizontal location of the apertures and their orientation can vary within limits. The couplings for connecting the container to the supply and return ducts must therefore be capable of being moved between a withdrawn position so that the containers can be placed in position between the guides and an operative position in which they can form a seal around the periphery of the respective aperture in a container side wall regardless of the precise location of the container.

Several constructions of container couplings are already known and one of the most satisfactory is that the subject of U.K. Pat. No. 1,318,421 (U.S. Pat. No. 3,713,623, granted Jan. 30, 1973). This coupling is, however, expensive to manufacture. Another known coupling is that the subject of U.K. Pat. No. 1,229,138 which incorporates an inflatable rubber tube to move the coupling from its withdrawn to its operative position. The disadvantage with this coupling, however, is that it cannot cope satisfactorily with the differences in distance between the container wall containing the apertures and the supply and return ducts. If this container is very close then the inflation pressure of the rubber tube is such as to subject the container wall to undesirable pressures and if the container wall is at its maximum distance away then the rubber tube goes rigid which means that the coupling cannot move sideways to form a satisfactory seal with an off-center container.

The present invention seeks to provide a container coupling which does not suffer from the above-mentioned disadvantages, is of lightweight construction, and is relatively cheap and simple to manufacture.

According to the present invention, we provide a coupling suitable for connecting an aperture leading to the interior of a container with a duct for the supply or return of fluid, the coupling having a first end adapted for connection to the duct and a second end sealingly engageable in abutting relationship with a flat sealing surface surrounding the aperture in the container, there being sealing means on the face of said second end and said second end being movable relative to said first end between a withdrawn inoperative position and an extended sealing position, the coupling having an annular body extending in sealing engagement between the first and second ends and including a rolling diaphragm between at least one end of the annular body and the end of the coupling associated with said at least one end, the rolling diaphragm being in sealing engagement with the coupling end and the body, the rolling diaphragm defining an annular inflatable space between the body and coupling end so that the application of fluid to said space will cause the second end of the coupling to move towards its extended sealing position.

Preferably, a rolling diaphragm is located at each end of the coupling so that there is a rolling diaphragm between each end of the annular body and the associated coupling end. Preferably, the interior of the two rolling diaphragms are in fluid communication with each other, for example by means of one or more passages extending through the annular body. Preferably, the annular body is formed of a rigid expanded plastics material and each rolling diaphragm is formed of a rubbery material. Preferably, the coupling further includes hinge means interconnecting the first and second ends of the coupling to permit limited rocking about a vertical axis and limited hoizontal movement of the second end relative to said first end and means to return said second end to its withdrawn position.

Each end of the coupling is an annulus which is preferably of U-shaped cross-section, the arms of the U's extending towards each other and defining an annular space, the annular body being located within said space but leaving sufficient room at each end to locate the rolling diaphragms. Preferably, the rolling diaphragms are formed of an annular sheet of rubber folded upon itself to define said inflatable space, the two edges of the sheet being sandwiched between a clamp ring and the base of the U.

Preferably, the hinge means comprises a scissor hinge comprising two plates pivotally connected together about a vertical axis and pivotally connected respectively to the first and second ends of the coupling. Preferably, the second end of the coupling is connected to one of said plates by means of a further horizontal pivot permitting limited pivotting of the second end relative to the first end to accommodate lack of vertical alignment either of the container face or the duct.

Preferably, a valve is associated with said coupling to control the passage of fluid through the coupling. Normally, the valve would be mounted within one of the parts of the coupling. The valve is preferably a traditional skew-axis butterfly valve with its pivot axis mounted at right angles to the longitudinal axis of the extension or duct. There are many ways in which the butterfly valve could be moved between its open and closed positions. In the preferred embodiment, an arrangement such as that described in U.K. Pat. No. 1,318,421 is used, whereby, when the two ends of the coupling are moved apart, a linkage automatically pivots the valve to its open position and vice versa. Where it is required to open or close the valve regardless of the relative position of the two ends of the coupling, some form of power operated mechanism will be required. For example, in one construction the valve pivot axle could be caused to rotate by means of a helical spline arrangement operated by a pneumatic device which could incorporate a rolling diaphragm, or by means of a rack and pinion device. The latter construction is, however, preferred, the two ends of the pivot axle extending outwardly of the duct or extension and having pinions mounted thereon engageable with racks, the racks being connected to an annular piston located around the duct or extension and again incorporating a rolling diaphragm.

The invention is now described by way of example with reference to the accompanying drawings, in which.

Figure 1:
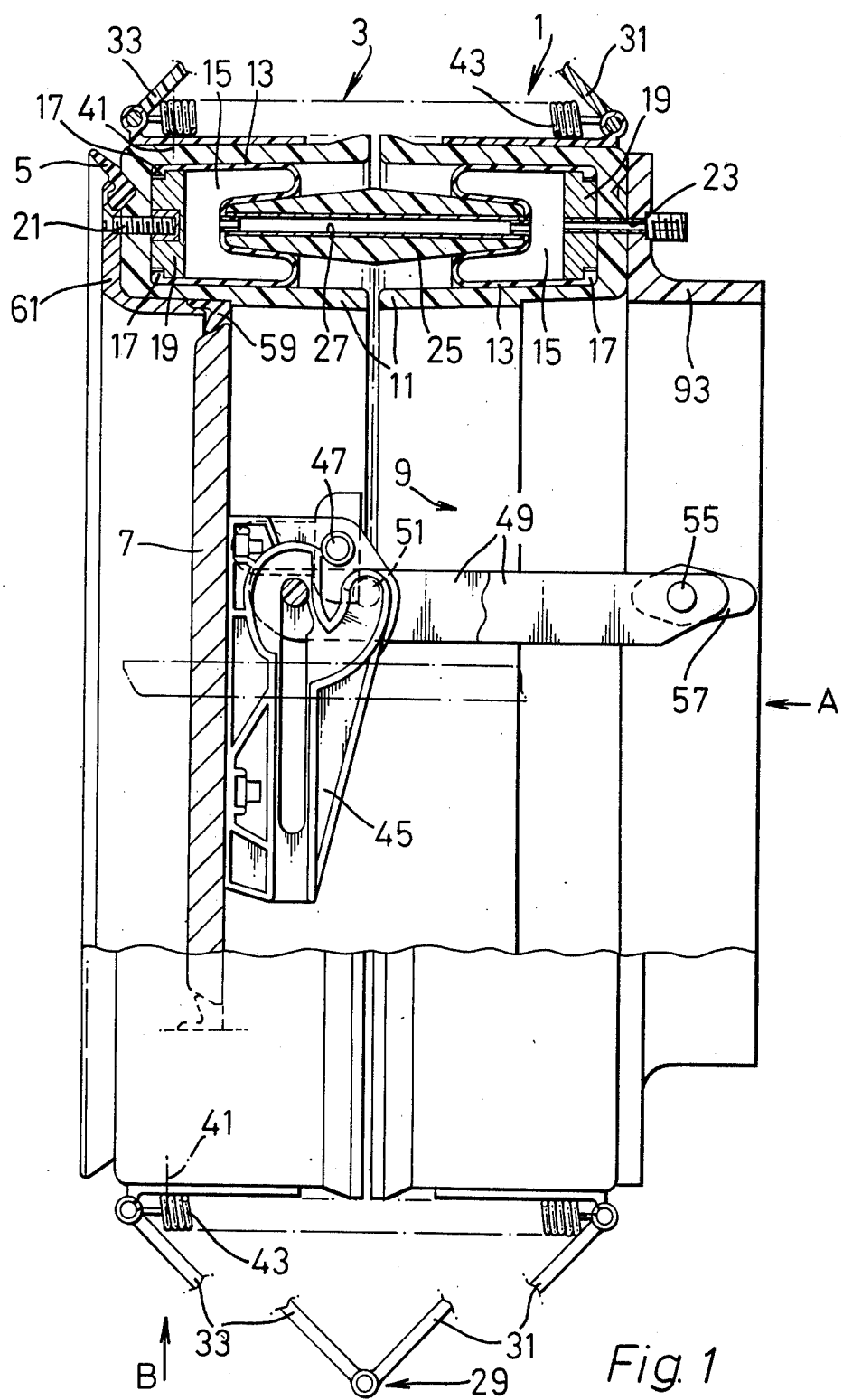
FIG. 1 is a side elevation of the coupling with the top half of the drawing being in section.
Figure 2:
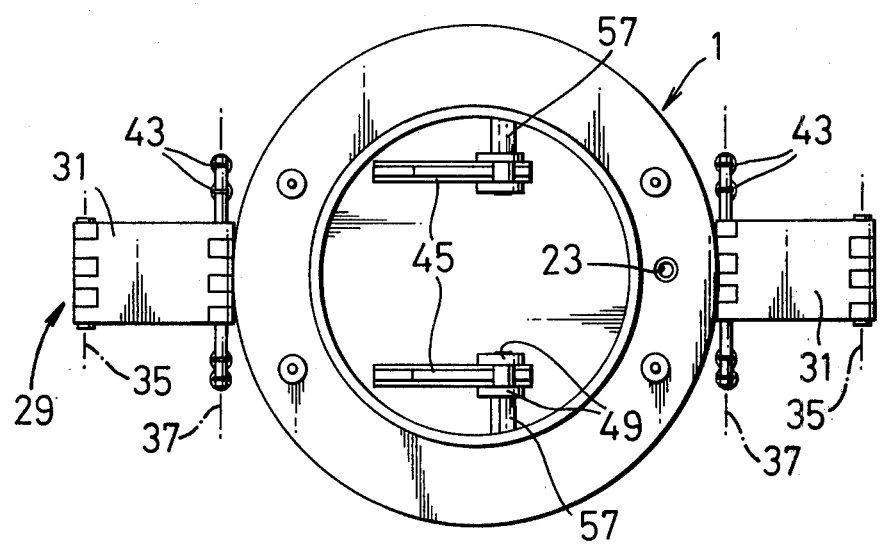
FIG. 2 is an end view of the coupling shown in FIG. 1 looking in the direction of the arrow A.

Referring to the drawings, the coupling is illustrated in its withdrawn inoperative position and has a first end 1 adapted for connection to a duct leading to a source of conditioning gas and a second end 3 sealingly engageable around an aperture in a container wall, there being an annular seal 5 mounted within a groove of the face of the second end 3. As shown, a skew-axis butterfly valve 7 is mounted across the second end 3. Each of the ends 1 and 3 is of generally annular construction so as to define a passageway 9 through the coupling, the walls of the annuli in cross-section being generally U-shaped with arms 11 of the U's facing towards each other. Each of the ends 1 and 3, apart from the differences already noted, are substantially identical and hence only one will be described further. A rolling diaphragm 13, formed of resiliently deformable rubbery material such as polychloroprene is located in the base of the U, the diaphragm preferably being formed of a sheet of material folded upon itself to define a generally inflatable space 15.

The edges of the diaphragm 13 are formed with beads 17, and a clamp ring 19, which is bolted to the base of the U by way of bolts 21, clamps these beads 17 into the corners of the base of the U, the clamping face of the ring 19 being cut-away at the edges to accommodate the beads 17.

One or more inflation tubes 23 extend outwardly through a passage in the base of the U for connection to a source of compressed air to inflate the space 15. The rolling diaphragms 13 in their relaxed position are generally U-shaped with the arms of the U facing each other, and located between the two diaphragms and bonded thereto is an annular coupling body 25 formed of a rigid foam material, such as a polyurethane foam material, the two ends of which are embraced by the rolling diaphragms 13. It is important that the body 25 is fluid impervious, and if it is formed of polyurethane foam, it has an impervious skin. So that the inflation spaces within the two diaphragms can be inflated equally, there should be fluid communication between the two and it is preferred that this is provided by one or more axial passageways 27 extending through the body 25. In this case it is only necessary for one inflation tube 23 to be provided for each coupling but in an alternative arrangement, each rolling diaphragm 13 may have an inflation tube 23 connectable to a common source of fluid pressure. The diaphragms 13 are bonded to the ends of the body 25 and may alternatively be clamped thereto.

The two ends 1 and 3 of the coupling are connected together by a pair of scissor hinges 29, each formed of plates 31 and 33 pivotally connected about a vertical axis at 35, the plate 31 being pivotally connected to the end 1 about a vertical axis at 37 and the plate 33 being connected to the end 3 about a vertical axis 39 through the intermediary of a horizontal pivot 41. The two ends 1 and 3 are also connected together by a plurality of springs 43 which will return the end 3 of the coupling to the position illustrated from its extended operative position when the pressure within the rolling diaphragm spaces 15 is released.

To move the coupling from its position illustrated to an extended operative position with the annular seal 5 in engagement around an aperture in the wall of a container, it is merely necessary to apply pressure to the spaces 15. This would normally be achieved pneumatically and would cause the rolling diaphragms to extend so as to move the end 3 to the left as shown in FIG. 1. Because of the construction of the rolling diaphragms, a substantially constant force will be applied to each annular end face of the body 25 thereby applying a substantially constant sealing force to the end 3 regardless of the degree of inflation of the spaces 15. Because the rolling diaphragms are only connected to the annular end faces of the body 25, the diaphragms will permit rolling of the body relative to the two ends of the coupling so that with the end 1 fixed, the end 3 can move from side to side and can pivot about an imaginary vertical axis passing through the center of the body 25. This movement can be accommodated by the scissor hinges 29 and furthermore, because of the horizontal pivot 41, end 3 can also rock about a horizontal axis thereby accommodating all the possible positions that a container could be in when located within its guides. Hence a satisfactory seal around the aperture will be achieved at all times.

When it is required to disconnect the coupling from the container, the pneumatic pressure within the spaces 15 can merely be released thus allowing the springs 43 (or other means) to return the end 3 to the illustrated position.

Although two rolling diaphragms are illustrated, it is envisaged that the coupling would work reasonably well with only one rolling diaphragm arranged between one end of the coupling and an adjacent end of the body 25, in which case the other end of the body 25 would be connected rigidly to, or form the other end of the coupling. Obviously, the connections between the arms 11, the diaphragm 13 and the body 25 are such as to prevent passage of fluid to the exterior of the coupling.

Preferably, the two end members 1 and 3, including the arms 11, are formed of a rigid plastics material, such as glass-filled polyester. This material is an extremely good heat insulator meaning that refrigerant gas can be passed through the passageway 9 within the coupling with the minimum of frosting up of the coupling occurring.

The butterfly valve 7 is shown in FIG. 1 in a closed position preventing passage of conditioning fluid through the passageway 9 and also of course preventing unwanted material from entering into the duct, and can be moved to an open position approximately at right angles to the illustrated position in many different ways.

As shown in FIG. 1, the valve 7 is connected to a mechanism for automatically opening the valve when the coupling is moved to its extended operative position and vice versa. This type of automatic opening and closing mechanism is described in the specification of our British Pat. No. 1,318,421. Briefly, the mechanism consists of a pair of slider tracks 45 to which the disc of the valve 7 is connected, and each of which is pivotally mounted on a shaft 47 which is held in a bearing block slidably mounted for a limited distance, against a spring bias, on the inner face of the end 3. A connecting link 49, which consists of a pair of parallel arms which pass either side of the slider track 45, connects at one end with the track 45 by way of a pair of projections 51 which engage in curved cam slots formed in the track 45. The link 49 is pivotally mounted at its other end to a pivot pin 55 held in a boss 57 formed on the inner face of the end 1.

As the two ends 1 and 3 of the connector are forced apart, by the admission of compressed air to the spaces 15 within the diaphragms 13, the valve unseats and the action of the two pins 51 and 53 causes the track 45 and the valve 7 connected to it, to pivot about the pin 47 to open the valve to the position shown in chain-dotted lines in FIG. 1, and vice versa. The edge of the valve 7 seals against an annular seal 59, which is located in a groove formed on the outer edge of the inner face of the part 3. A clamp ring 61, of L-shaped cross-section, is bolted to the end face of the part 3 and serves to clamp the two seals 5 and 59 in position.

As described in U.K. Pat. No. 1,318,421, the mountings of the pins 47 to the end 3 are such that during the initial movement apart of the two parts 1 and 3 of the connector, the disc 7 is lifted off the seal 59, and the pivoting to an open position occurs only when the disc 7 is retracted sufficiently so as not to foul the seal 59 during its pivoting movement.

In certain applications for the connector of the present invention it may be desirable to open and close the valve 7 reagrdless of the position of the two parts of the connector. For this purpose an independently operable actuating device is required and an example of such a device is shown in FIG. 4.

Figure 4:
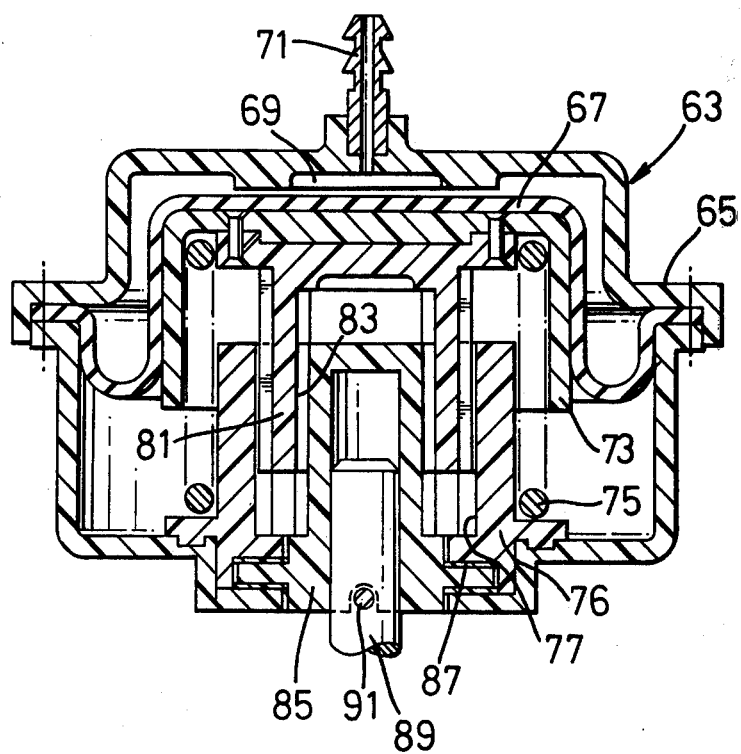
FIG. 4 is a sectional view of one form of pneumatic device for operating the valve shown in FIG. 1.

Basically, FIG. 4 shows a pneumatic piston and cylinder device 63, the cylinder 65 of which is fixed, for example, to one of the ducts leading to the supply of gas. Mounted within the cylinder 65 is a rolling diaphragm 67 which defines with part of the cylinder 65 an expansion chamber 69 communicating with an inlet 71 connectable to a fluid pressure supply. The rolling diaphragm 67 is secured to a piston 73 biassed to the illustrated position by a coil spring 75, the end of the spring remote from the piston 73 bearing against the end of the cylinder 65 remote from the chamber 69. Also fixed to this end of the cylinder 65 against rotation is a sleeve 76 internally splined with axial splines 77, the splines 77 engaging with external splines on a cylindrical projection 81 of the piston 73. The cylindrical projection 81 is formed on its inner circumference with helical splines 83 inclined at about 30° to the axis of the cylinder, i.e., with a fast lead, these helical splines 83 mating with further external helical splines on a housing 85 mounted within the cylinder 65 in thrust bearings 87. The end of a shaft 89 to which the valve 7 is secured is located within the housing 85 and rotation of the housing is imparted to the shaft 89 by means of a diametral pin 91 in the shaft engaging in a slot in the housing 85. It will thus be appreciated that on application of fluid pressure to the chamber 69, the piston 73 will be extended from the illustrated position thus imparting rotary movement to the shaft 89 to open the valve. The parts 76, 81 and 85 are preferably formed of a low-friction plastics material such as acetyl resin, for example DELRIN. Preferably, a stop is provided in the passageway 9 to prevent the valve disc moving through more than 90°.

When it is desired to close the valve, pressure can be released from the chamber 69 whereupon the spring 75 will move the piston 73 back to its illustrated position thus causing the valve disc to pivot back through 90°.

In an alternative and preferred construction, which is not illustrated, an identical valve to that described above is used but its shaft 89 is located at right angles to the longitudinal axis to the passageway 9 and a pinion gear, for example having about 1" diameter, is mounted on each end of the shaft 89 which of course projects outwardly from the passageway or from an extension 93 of the passageway a sufficient amount to receive the pinions. Located around the extension 93 is an annular piston and cylinder device incorporating a rolling diaphragm so that on application of fluid pressure to the device the piston will be extended. Pivotally or otherwise mounted at approximately diametrically opposite locations to the pistons are two racks which engage with the pinions. Both the racks will engage the pinions on the same side of the shaft 89 and each will be housed in a plastic mounting mounted on the outside of the extension 93 which acts as a guide track. Springs will be used to return the piston and cylinder device to its unextended position on release of fluid pressure to the piston and cylinder device.

It is envisaged that other types of valve operating mechanism could be provided and although it is preferred to synchronize operation of the valve with extension and retraction of the coupling, as described, it is of course possible for the two to be operated separately so that in any particular installation some valves can be open and some can be shut when all the couplings are extended and vice versa.

In the case of the power operated embodiments, it is preferred that the disc valve is moved from its closed position anti-clockwise through 90° to its open position by a spring return force and is moved to its closed position by power means, e.g., one of the pneumatic piston and cylinder devices described. This means therefore that an annular seal around the periphery of the disc will wipe the interior surface of the extension 93 when the spring is acting and will be moved in the opposite direction by the power source. This is the other way round from the standard practice.

Figure 3:
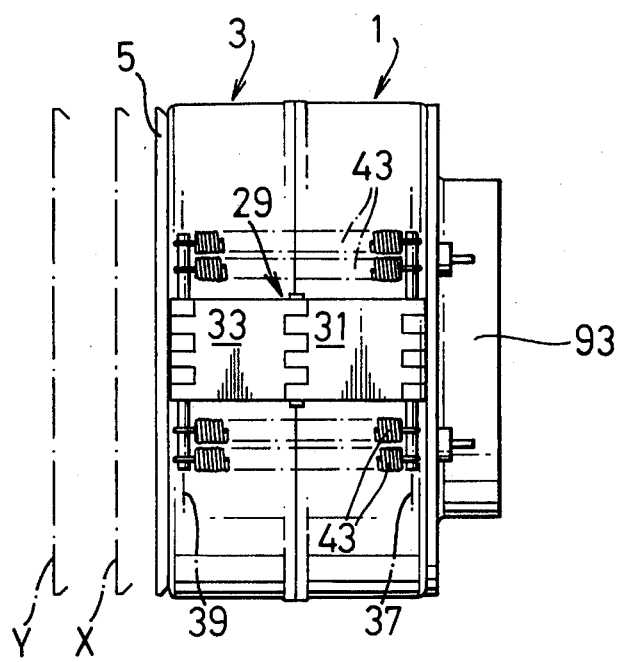
FIG. 3 is a side view of the coupling shown in FIG. 1 looking in the direction of the arrow B.

As shown in FIG. 3, the movement of the end 3, relative to the fixed end 1, to the position marked "X" is sufficient to open the valve 7 fully, by way of the automatic opening mechanism described above. The end 3 is then free to move until it reaches the position marked "Y" and in normal operating conditions the wall of a container will be located somewhere between the two positions X and Y. If the end 3 should fail to locate a container within this gap, it is envisaged that an automatic trip valve (not shown) will operate, on movement of the end 3 beyond the Y position, which vents the compressed air from within the two spaces 15 thus causing the end 3 to retract under the action of the springs 43, so closing the valve 7 again.

What is claimed is:

1. A coupling suitable for connecting an apparatus leading to the interior of a refrigerated transport container with a duct for the supply or return of fluid, said coupling comprising a generally tubular device defined by separately formed first and second ends, means carried by said first end for connection to a duct and sealing means carried by said second end for sealing abutting relationship with a flat sealing surface surrounding an aperture in a container, said generally tubular device including a rolling diaphragm fixedly connected to one of said ends, said rolling diaphragm together with portions of said one end defining an annular inflatable closed space, said rolling diaphragm having an annular face portion facing the other of said ends with said annular face portion being defined by reversely turned portions of said diaphragm defining a U-shaped cross-sectional part of variable depth, and an annular force transmitting means carried by said other end and having an end portion remote from said other end seated in said diaphragm U-shaped cross-sectional part, said force transmitting means together with said diaphragm defining a conduit between said ends, means for applying fluid pressure to said closed space to cause extension and rolling of said diaphragm relative to said force transmitting means and movement of said ends apart, whereby said tubular member is extended and said coupling moved from a withdrawn inoperative position towards an extended sealing position engagement with a container to provide a fluid passageway from a duct to the interior of a container.

2. A coupling as claimed in claim 1 wherein said force transmitting means includes a second rolling diaphragm located on said other end and forming therewith a closed inflatable space, and an annular body positioned between said two rolling diaphragms whereby a rolling diaphragm is provided between each end of said annular body and the associated one of said first and second ends.

3. A coupling as claimed in claim 2 wherein there are passage means placing said closed inflatable spaces within said two rolling diaphragms in fluid communication with each other.

4. A coupling as claimed in claim 3 wherein said passage means is in the form of one or more passages extending through said annular body and said rolling diaphragms.

5. A coupling as claimed in claim 2 wherein each of said first and second ends is in the form of an annulus which is of U-shaped cross-section including spaced arms, the arms of the U's of each end extending towards each other and defining an annular space therebetween, said annular body being located within said space.

6. A coupling as claimed in claim 5 wherein each of said rolling diaphragms is formed of an annular sheet of rubbery material folded upon itself to define in conjunction with its respective annulus of U-shaped cross-section the respective one of said inflatable spaces, each sheet having two edges, and a clamp ring sandwiching said two edges of each sheet between itself and the base of the U-shaped cross sections of the respective annulus.

7. A coupling as claimed in claim 1 wherein said ends lie in vertical planes and said coupling further including hinge means interconnecting said first and second ends said hinge means having a vertical axis and a horizontal axis and functioning to permit limited rocking of said ends about a vertical axis and limited horizontal movement of said second end relative to said first end, and means extending between said first and second ends to return said second end towards said first end on removal of said fluid pressure.

8. A coupling as claimed in claim 7 wherein said hinge means includes two plates, first pivot means pivotally connecting said plates about said vertical axis and further pivot means pivotally connecting said plate respectively to said first and second ends of the coupling.

9. A coupling as claimed in claim 8 wherein a further pivot means permits limited pivotting of said second end of said coupling relative to the first end to accommodate lack of vertical alignment either of a container face or a duct connects the second end of the coupling to one of said plates.

10. A coupling as claimed in claim 1 wherein a valve is associated with said coupling to control the passage of fluid through the coupling.

11. A coupling as claimed in claim 10 wherein said valve is in the form of a butterfly valve, mounting means carried by one of said ends pivotally mounting said valve across said coupling and said valve being pivotable between a first position in which the coupling is sealed to prevent the passage of fluid there-through and a second position in which the fluid is free to move through said coupling.

12. A coupling as claimed in claim 11 including control means for said butterfly valve carried by the other of said ends and said butterfly valve wherein said butterfly valve is pivotable from its first to its second position on movement of said second end away from said first end.

13. A coupling as claimed in claim 11 wherein said mounting means includes a pivot shaft, said butterfly valve including a disc, means connecting said butterfly valve disc to said pivot shaft, a pneumatically operated reciprocatable piston device, and a helical spline arrangement operatively connected between said pivot shaft and said pneumatically operated reciprocatable piston device for rotating said pivot shaft.

14. A coupling as claimed in claim 13 wherein said piston device incorporates a rolling diaphragm.

15. A coupling as claimed in claim 11 wherein said butterfly valve disc, when in its first position, bears against an annular seal located on the inner surface of said second end.

16. A coupling as claimed in claim 15 including a clamp ring holding said annular seal in position, said clamp ring being of L-shaped cross-section and having arms, one of the arms of said clamp ring bearing on said annular seal, and the other of said arms bearing on and locating said sealing means on the face of said second end.

* * * * *